(12) United States Patent
Voyles

(10) Patent No.: US 8,063,502 B1
(45) Date of Patent: Nov. 22, 2011

(54) SHROUDED WIND TURBINE WITH DUAL COAXIAL AIRFLOW PASSAGEWAYS

(76) Inventor: Robert L. Voyles, Bloomington, MN (US)

(*) Notice: Subject to any disclaimer, the term of this patent is extended or adjusted under 35 U.S.C. 154(b) by 416 days.

(21) Appl. No.: 12/343,213

(22) Filed: Dec. 23, 2008

Related U.S. Application Data

(60) Provisional application No. 61/009,057, filed on Dec. 26, 2007.

(51) Int. Cl.
*H02P 9/04* (2006.01)
(52) U.S. Cl. .......................................... 290/55
(58) Field of Classification Search .......... 415/2.1, 415/4.1, 4.2, 4.3, 4.5; 290/44, 55, 43, 54
See application file for complete search history.

(56) References Cited

U.S. PATENT DOCUMENTS

| | | | |
|---|---|---|---|
| 4,057,270 A * | 11/1977 | Lebost | 290/54 |
| 4,084,918 A * | 4/1978 | Pavlecka | 415/1 |
| 4,116,581 A * | 9/1978 | Bolie | 415/4.4 |
| 4,191,505 A * | 3/1980 | Kaufman | 415/2.1 |
| 4,224,527 A * | 9/1980 | Thompson | 290/54 |
| 4,242,628 A | 12/1980 | Mohan et al. | |
| 4,551,631 A * | 11/1985 | Trigilio | 290/55 |
| 5,083,899 A * | 1/1992 | Koch | 415/2.1 |
| 5,394,016 A | 2/1995 | Hickey | |
| 5,447,412 A * | 9/1995 | Lamont | 415/4.2 |
| 5,844,324 A | 12/1998 | Spriggle | |
| 6,373,145 B1 * | 4/2002 | Hamrick | 290/44 |
| 6,765,309 B2 | 7/2004 | Tallal, Jr. et al. | |
| 6,835,043 B2 * | 12/2004 | Milan et al. | 415/8 |
| 6,877,948 B2 | 4/2005 | Cutcher | |
| 7,215,039 B2 | 5/2007 | Zambrano et al. | |
| 7,245,039 B2 | 7/2007 | DuHamel | |
| 2006/0108809 A1 * | 5/2006 | Scalzi | 290/55 |
| 2007/0126240 A1 * | 6/2007 | Richards et al. | 290/55 |
| 2009/0026770 A1 * | 1/2009 | Huntemann | 290/55 |
| 2010/0289265 A1 * | 11/2010 | Burns et al. | 290/44 |
| 2011/0037261 A1 * | 2/2011 | Champ et al. | 290/44 |

OTHER PUBLICATIONS

Source Unknown; 4 photographs of vertical axis wind turbines found by Applicant; 4 pages.
The Wheel and Axle; Hydroelectric Turbine; source unknown; found by Applicant; 1 page.
National Renewable Energy Laboratory; Wind-to-Hydrogen Project; <retrieved at http://www.nrel.gov/hydrogen/proj_wind_hydrogen.html Dec. 4, 2008>; 2 pages.

* cited by examiner

*Primary Examiner* — Tulsidas C Patel
*Assistant Examiner* — Stefan Mikailoff
(74) *Attorney, Agent, or Firm* — Neustel Law Offices

(57) ABSTRACT

A renewable energy system for converting wind power into electrical energy or other form of energy. The renewable energy system generally includes a first intake and a second intake, a shroud fluidly connected to the intakes by a first delivery tube and a second delivery tube respectively, and a turbine rotatably positioned within the shroud. The first delivery tube and the second delivery tube are fluidly connected to opposite sides of the shroud to provide the input of the pressurized air from the intakes into opposing portions of the turbine.

20 Claims, 9 Drawing Sheets

SHROUDED WIND TURBINE WITH DUAL COAXIAL AIRFLOW PASSAGEWAYS

CROSS REFERENCE TO RELATED APPLICATIONS

I hereby claim benefit under Title 35, United States Code, Section 119(e) of U.S. provisional patent application Ser. No. 61/009,057 filed Dec. 26, 2007. The 61/009,057 application is currently pending. The 61/009,057 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to renewable energy resources and more specifically it relates to a renewable energy system for converting wind power into an energy source.

2. Description of the Related Art

Any discussion of the related art throughout the specification should in no way be considered as an admission that such related art is widely known or forms part of common general knowledge in the field.

Wind powered systems have been in use for years. Conventional wind powered systems utilize turbine blades that rotate along a plane that is substantially tangential to the direction of the wind to generate electrical power and the like. While conventional wind powered systems are generally useful in larger applications (e.g. wind farms), they are not typically cost effective for usage in smaller applications such as for a personal residence.

Because of the inherent problems with the related art, there is a need for a new and improved renewable energy system for converting wind power into an energy source.

BRIEF SUMMARY OF THE INVENTION

The general purpose of the present invention is to provide a renewable energy system that has many of the advantages of the renewable energy applications mentioned heretofore. The invention generally relates to a renewable energy application which includes a first intake and a second intake, a shroud fluidly connected to the intakes by a first delivery tube and a second delivery tube respectively, and a turbine rotatably positioned within the shroud. The first delivery tube and the second delivery tube are fluidly connected to opposite sides of the shroud to provide the input of the airflow form the intakes into opposing portions of the turbine.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a renewable energy system for converting wind power into an energy source.

Another object is to provide a renewable energy system that may be utilized to generate various forms of energy such as but not limited to electricity.

An additional object is to provide a renewable energy system that reduces energy costs for a user.

A further object is to provide a renewable energy system that may be utilized upon smaller applications such as but not limited to commercial buildings or residential housing.

Another object is to provide a renewable energy system that may be combined into a "wind farm."

A further object is to provide a renewable energy system that may be attached to a non-movable structure (e.g. building, pole) or a movable structure (e.g. trailer).

Another object is to provide a renewable energy system that does not utilize complex mechanical components thereby reducing the likelihood of required repairs.

A further object is to provide a renewable energy system that may be utilized in extremely windy conditions.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
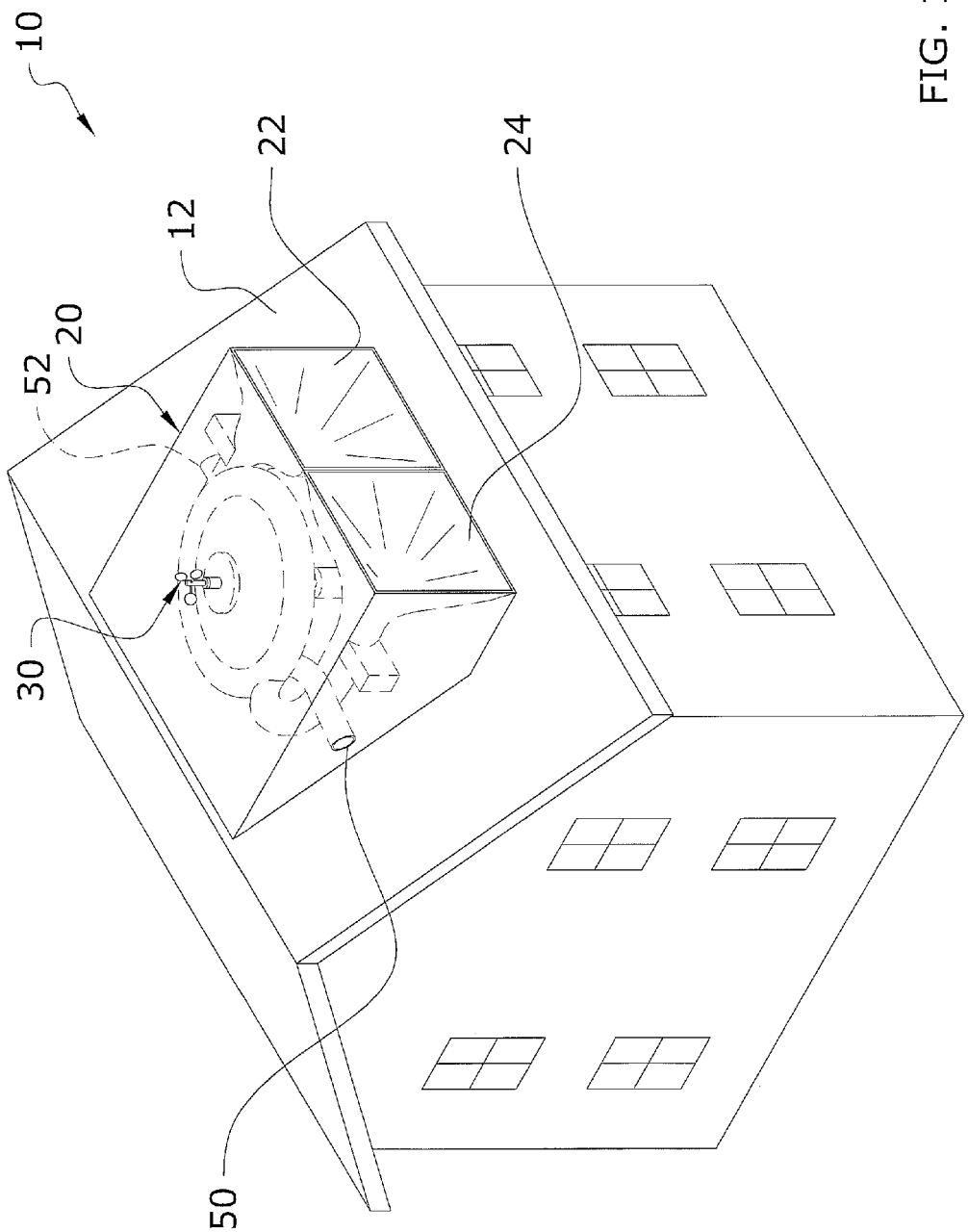
FIG. 1 is an upper perspective view of the present invention attached to a building structure.

A. Overview.

Turning now descriptively to the drawings, in which similar reference characters denote similar elements throughout the several views, FIGS. 1 through 9 illustrate a renewable energy system 10, which comprises a first intake 22 and a second intake 24, a shroud fluidly connected to the intakes by a first delivery tube 23 and a second delivery tube 25 respectively, and a turbine 26 rotatably positioned within the shroud. The first delivery tube 23 and the second delivery tube 25 are fluidly connected to opposite sides of the shroud to provide the input of the airflow form the intakes into opposing portions of the turbine 26.

B. Turbine.

FIGS. 2, 4, 5, 6 and 7 best illustrate an exemplary turbine 26 for use in the present invention. The turbine 26 is preferably comprised of a shroud defining a passage and a rotor 60 rotatably positioned within the shroud.

Figure 6:
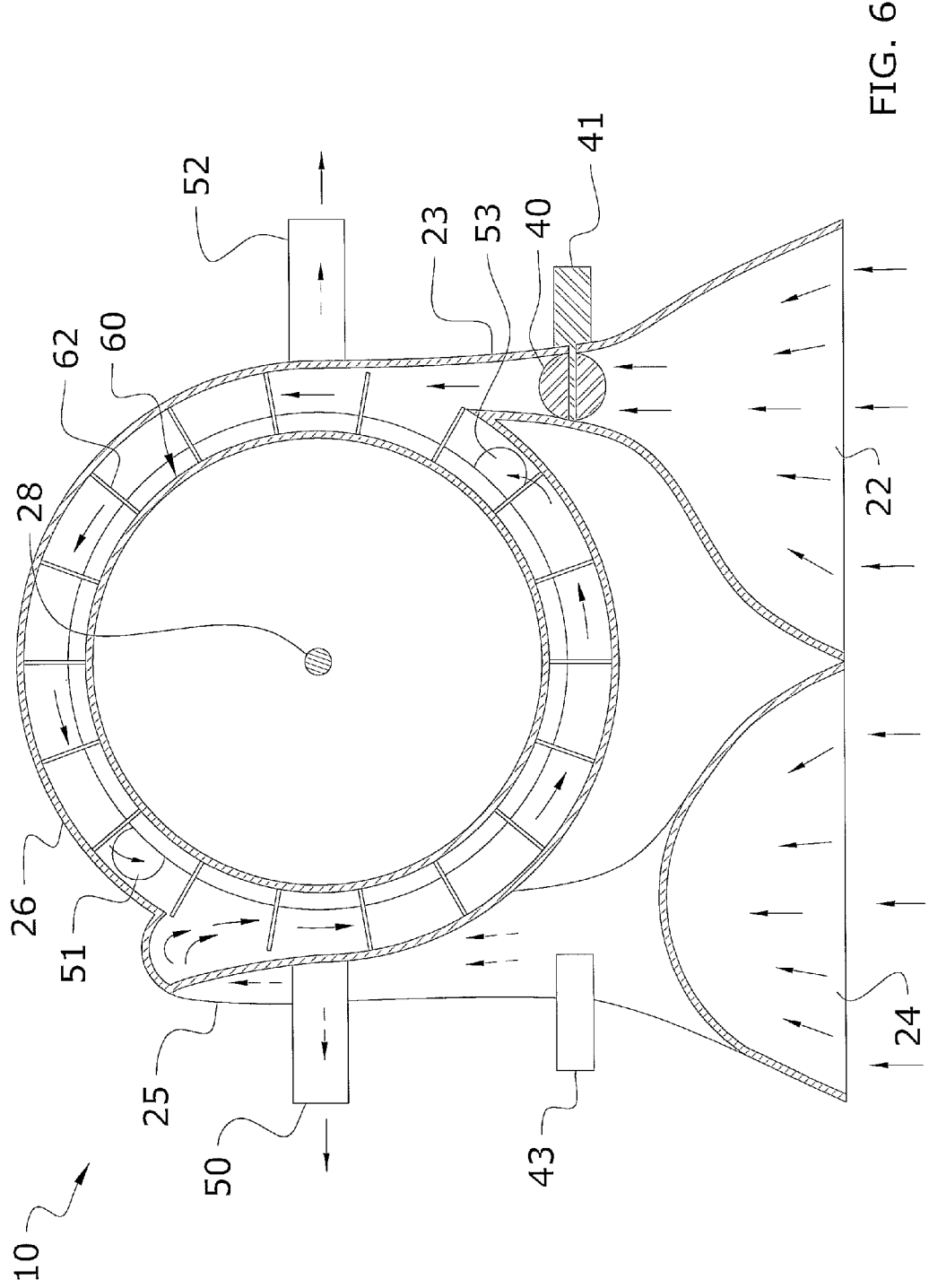
FIG. 6 is a cross sectional view taken along line 6-6 of FIG. 2.
Figure 7:
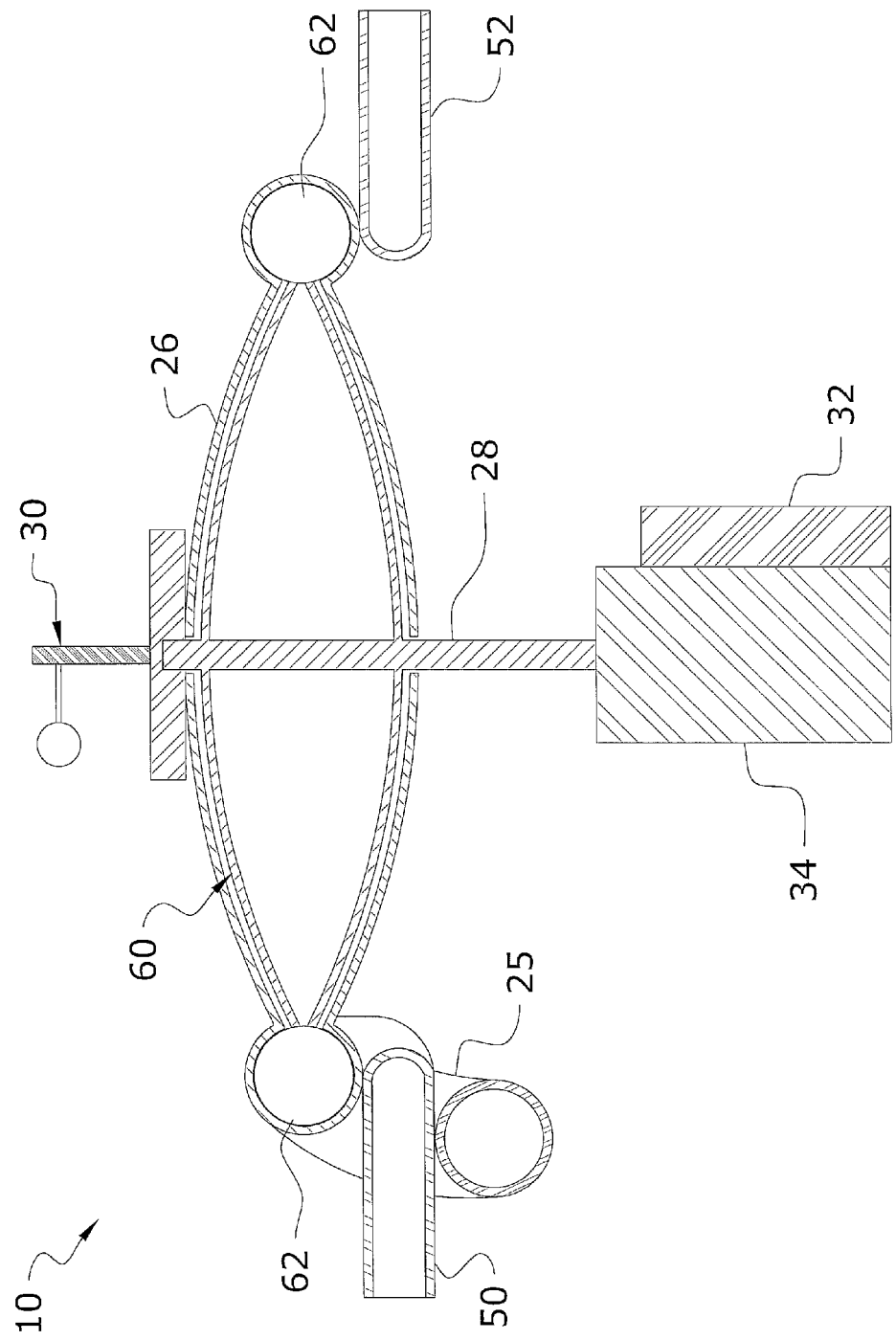
FIG. 7 is a cross sectional view taken along line 7-7 of FIG. 5.

The passage within the shroud is preferably comprised of a circular shape as best illustrated in FIG. 6 of the drawings. The passage further preferably is comprised of a circular cross sectional shape that corresponds to the shape and size of the paddles 62 as shown in FIG. 7 of the drawings. The inner wall of the shroud includes a slot that extends along the entire inner wall to allow for the support structure of the rotor 60 to extend through into the passage as illustrated in FIG. 7 of the drawings.

The rotor 60 includes a plurality of paddles 62 attached to a perimeter portion of the rotor 60 as best illustrated in FIGS. 6 and 7 of the drawings. The plurality of paddles 62 are positioned within the passage within the shroud substantially transverse with respect to the rotational movement through the passage. As illustrated in FIG. 7 of the drawings, the plurality of paddles 62 are preferably comprised of a circular shape that correspond to an interior shape of the passage. It can be appreciated that other cross sectional shapes may be utilized for the paddles 62 and the passage.

FIG. 1 illustrates a housing 20 surrounding the turbine 26 and related components of the present invention. The housing 20 may be comprised of various shapes and sizes sufficient to protect the turbine 26 and related components while providing an aesthetically pleasing appearance. The housing 20 may be attached to a roof 12 of a building structure as shown in FIG. 1 of the drawings, or to various other types of structures (e.g. pole, movable trailer). The present invention may also be attached to an off-shore structure (e.g. on a floating device, such as an ocean platform or tower). The present invention is preferably mounted so that the intakes 22, 24 are directed toward the direction of the prevailing wind.

C. Generator.

Figure 3:
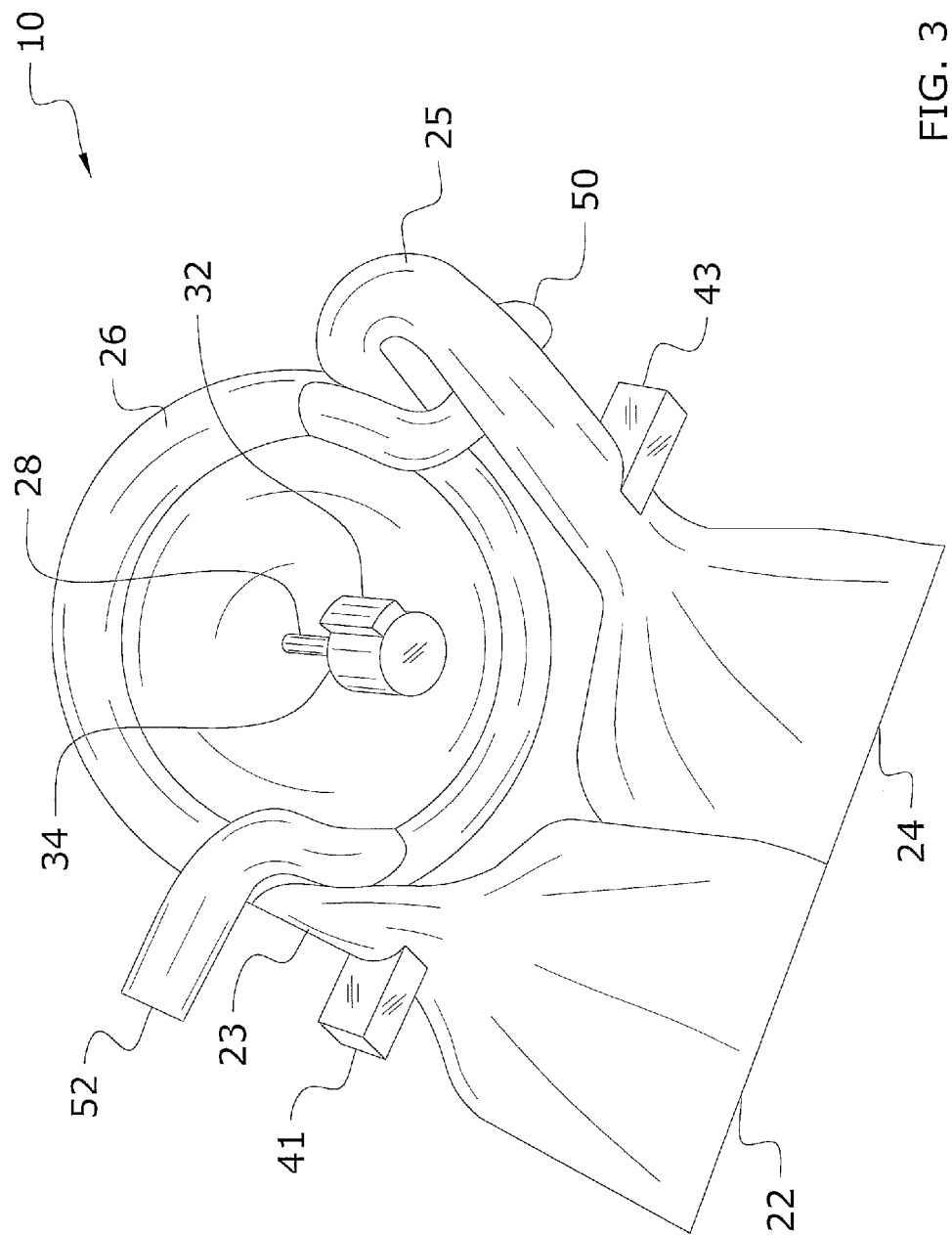
FIG. 3 is a lower perspective view of the present invention.

FIGS. 3 and 7 illustrate a generator 34 mechanically connected to the turbine 26 for generating energy. The generator 34 is preferably connected to a shaft 28 extending concentrically from the rotor as best illustrated in FIG. 7 of the drawings. While the energy generated is preferably electricity, the energy created by the rotational force of the turbine 26 may be converted to various other types of energy (e.g. gas pressure, etc.).

D. Intakes.

Figure 2:
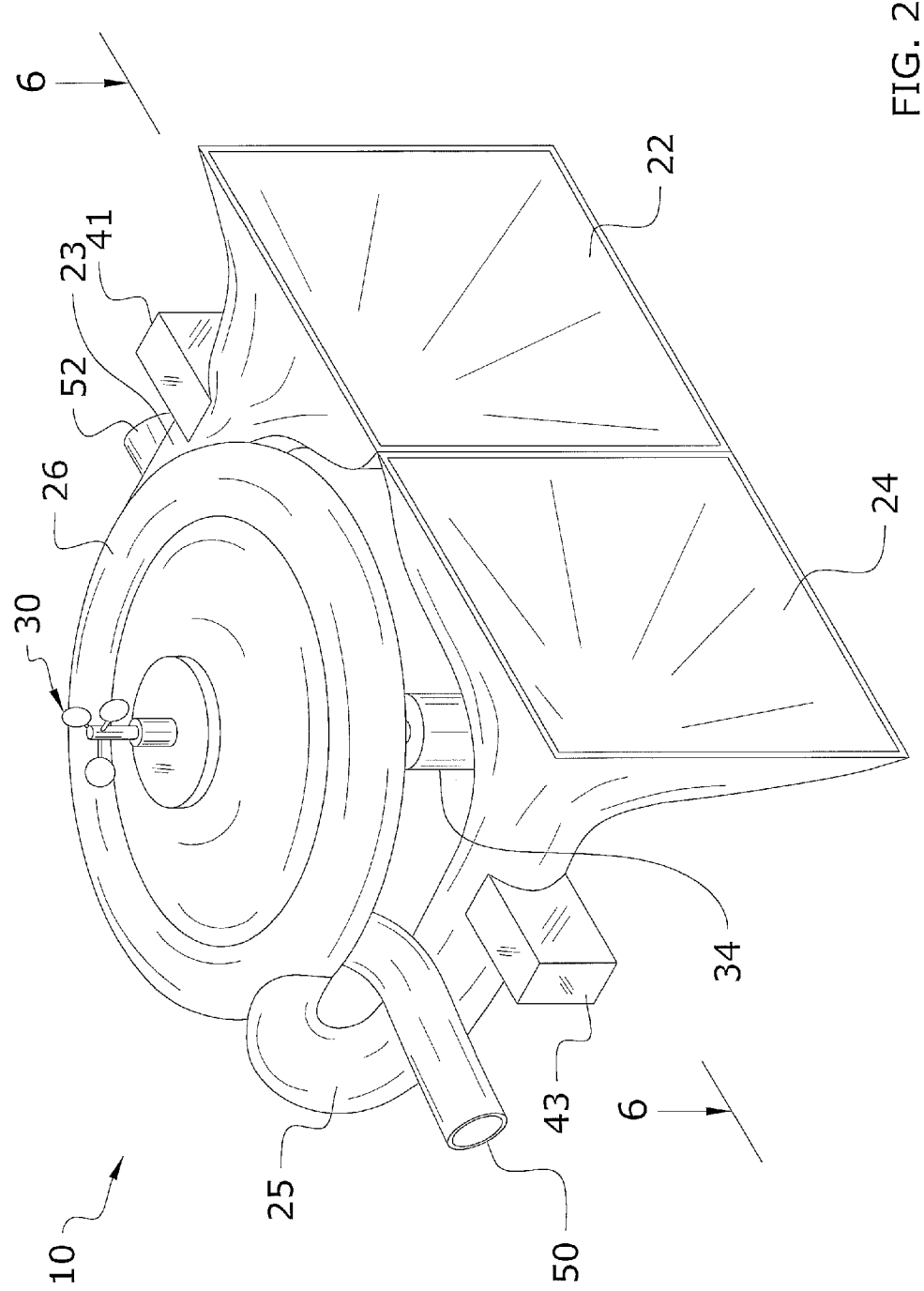
FIG. 2 is an upper perspective view of the present invention.
Figure 4:
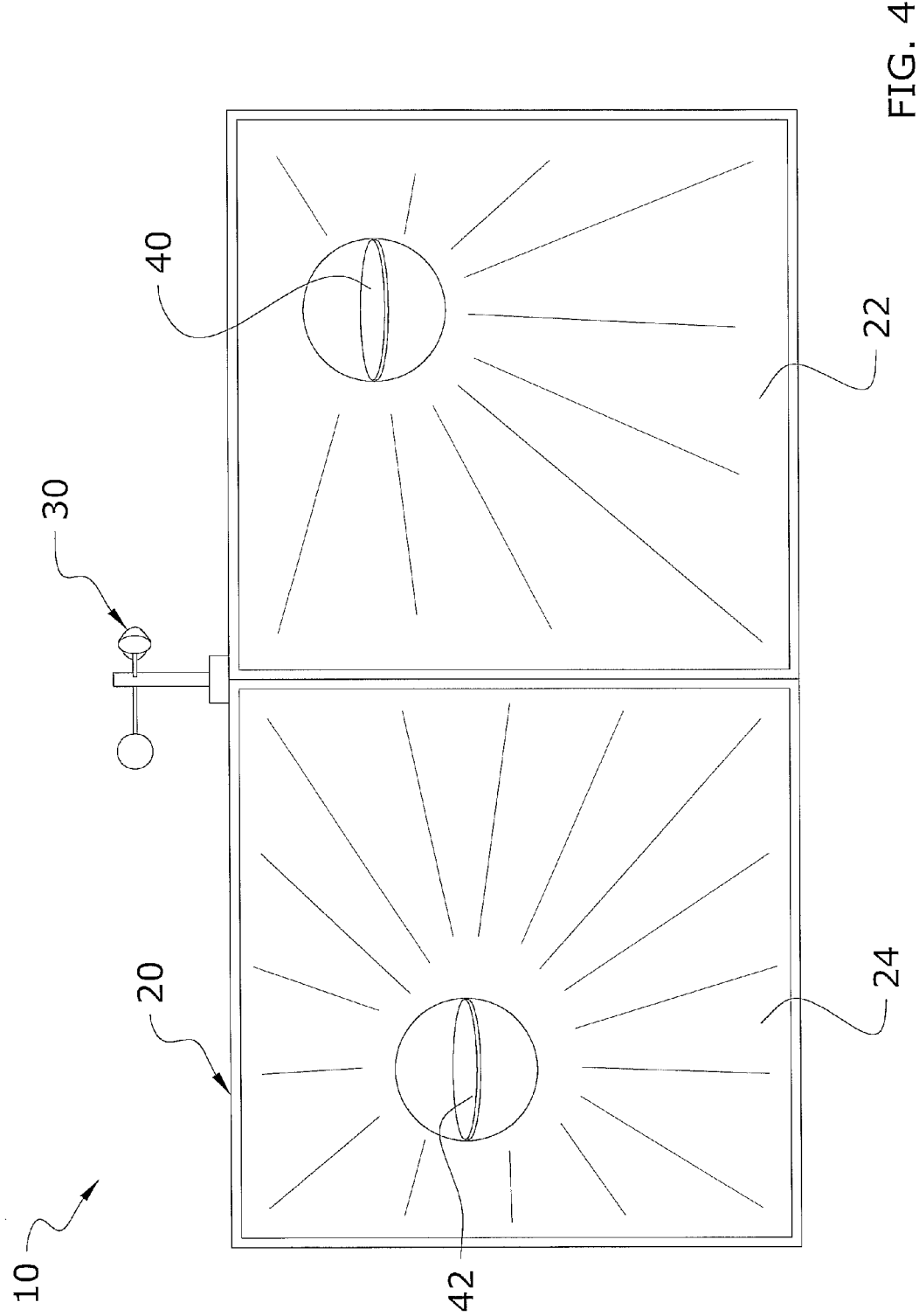
FIG. 4 is a front view of the present invention.

FIGS. 2 and 4 best illustrate the first intake 22 and the second intake 24 for collecting wind flow and directing the same to the turbine 26. The first intake 22 is fluidly connected to the turbine 26 at a first location and the second intake 24 is fluidly connected to the turbine 26 at a second location preferably opposite of the first location as illustrated in FIG. 6 of the drawings. The first intake 22 receives a first airflow from the wind and the second intake 24 receives a second airflow from the wind which is directed into the passage of the turbine 26 in the same rotation direction as further illustrated in FIG. 6 of the drawings.

A first exhaust opening 51 within the turbine 26 is fluidly connected to the passage such that the first airflow collected by the first intake 22 passes through a first portion of the passage and exits the first exhaust opening 51 as illustrated in FIG. 6. A second exhaust opening 53 within the turbine 26 is fluidly connected to the passage such that the pressurized air of the second airflow collected by the second intake 24 passes through a second portion of the passage and exits the second exhaust opening 53 as illustrated in FIG. 6. The first exhaust opening 51 is preferably positioned opposite of the second exhaust opening 53 as shown in FIG. 6. The first portion and the second portion of the passage are preferably separate from one another and do not overlap. The airflow within the first portion and the second portion of the passage is in a first direction thereby rotating the rotor in the first direction as further illustrated in FIG. 6 of the drawings.

Figure 5:
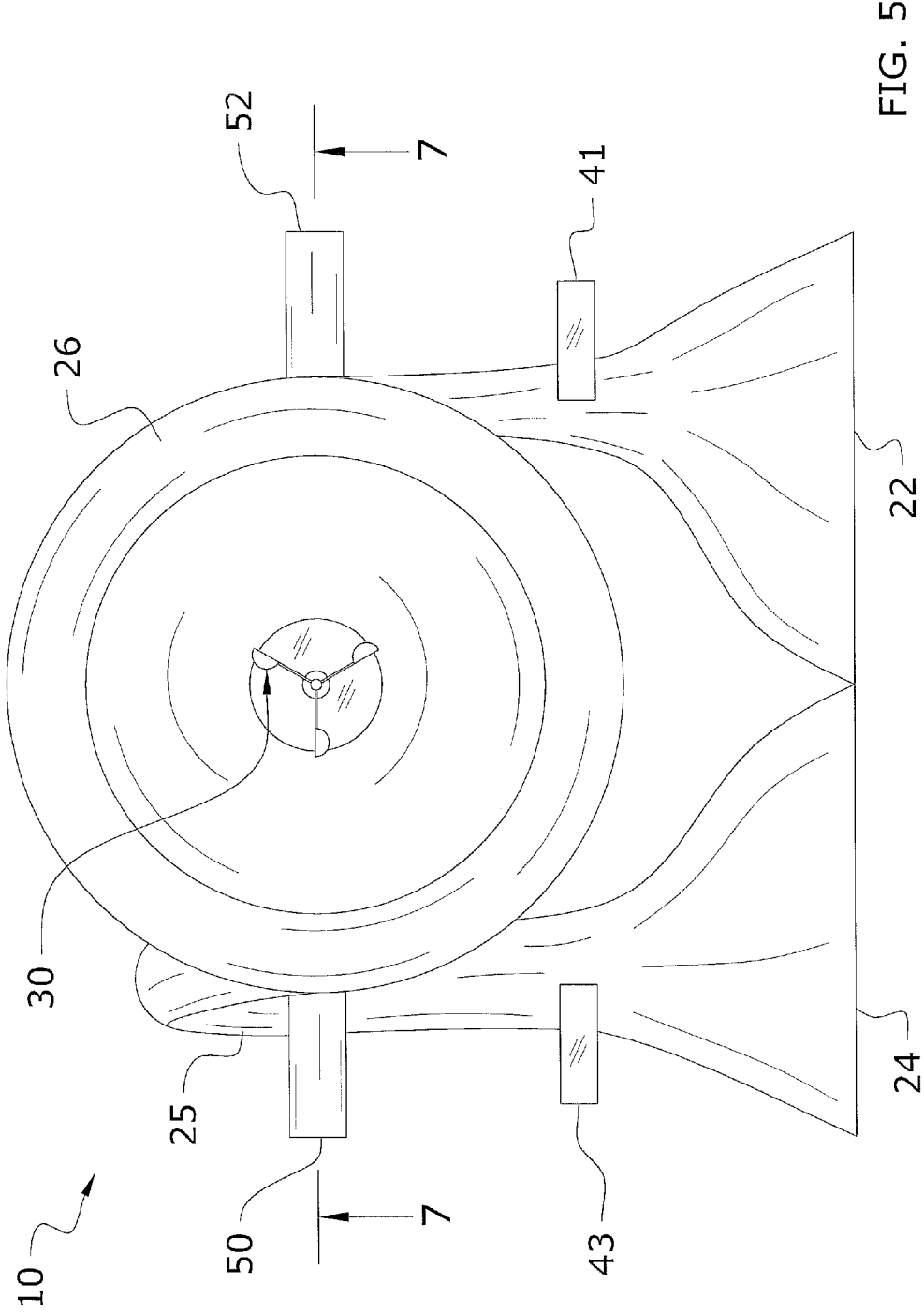
FIG. 5 is a top view of the present invention.

The first intake 22 is fluidly connected to the turbine 26 by a first delivery tube 23 and the second intake 24 is fluidly connected to the turbine 26 by a second delivery tube 25 as best illustrated in FIGS. 3, 5 and 6 of the drawings. The second delivery tube 25 includes a redirecting bend that provides a second direction to the second airflow to a direction substantially opposite of an initial direction of the second airflow as best illustrated in FIG. 6 of the drawings.

The first intake 22 and the second intake 24 are preferably directed toward a substantially same direction and adjacent to one another. In addition, the first intake 22 and the second intake 24 are each preferably tapered and are comprised of a rectangular opening as illustrated in FIGS. 2 and 4 of the drawings.

As shown in FIGS. 3 and 5 of the drawings, a first outlet 50 is preferably connected to the first exhaust opening 51 and extends outwardly from the turbine 26 through the housing 20. A second outlet 52 is preferably connected to the second exhaust opening 53 and extends outwardly from the turbine 26 through the housing 20 also. The first outlet 50 and the second outlet 52 release the waste air after the pressurized airflow has been converted to rotational energy within the turbine 26.

E. Baffles.

FIG. 4 illustrates a first baffle 40 within the first intake 22 to control the first airflow and a second baffle 42 within the second intake 24 to control the second airflow. A first actuator 41 is connected to the first baffle 40 and a second actuator 43 is connected to the second baffle 42 to manipulate the position of the baffles 40, 42. The baffles 40, 42 are preferably utilized to decrease the airflow in instances of high winds to prevent damage to the turbine 26.

F. Control Unit.

Figure 9:
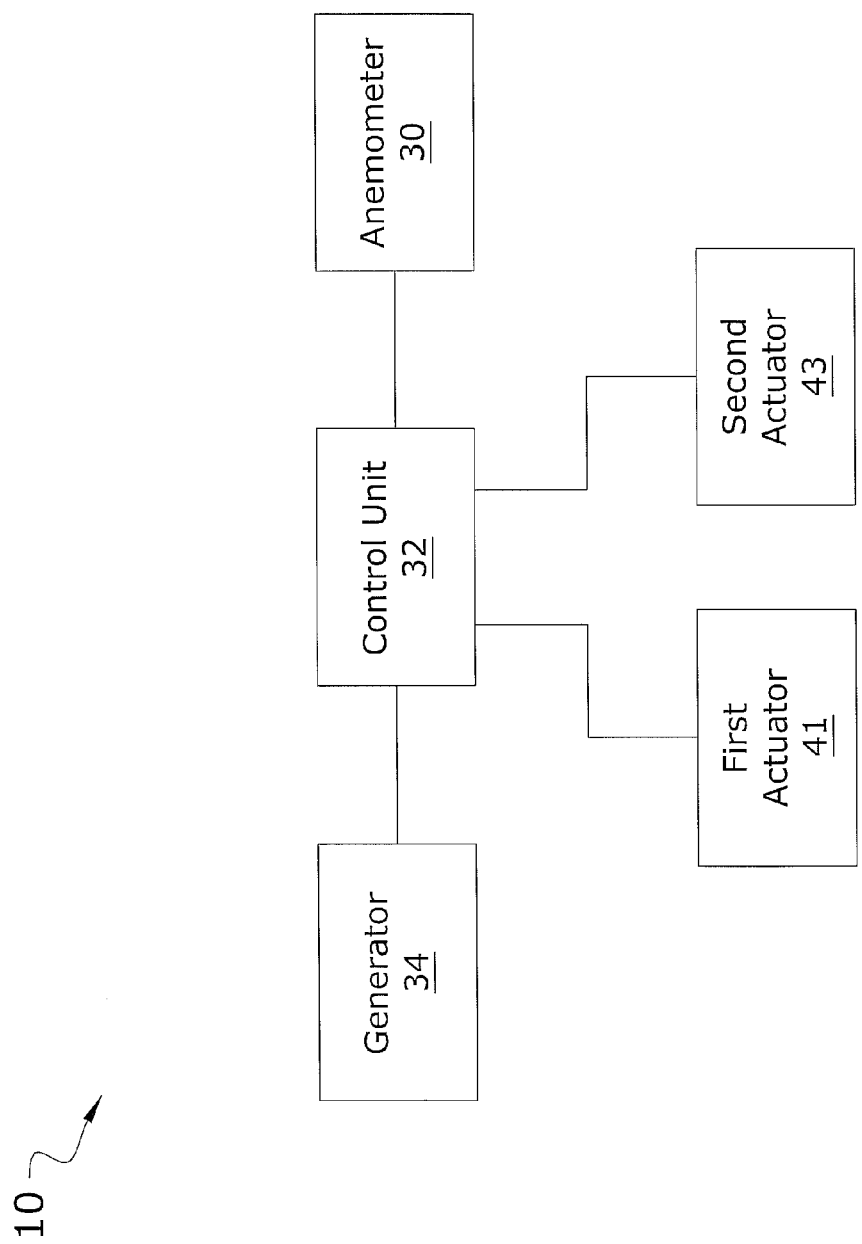
FIG. 9 is a block diagram illustrating the electrical components of the present invention.

FIG. 9 illustrates a control unit 32 in communication with and controlling the first actuator 41 and the second actuator 43. The control unit 32 may be comprised of any device comprised of a computer or capable of receiving, storing, calculating and transmitting data. An anemometer 30 is preferably in communication with the control unit 32 to provide wind velocity data to the control unit 32. The control unit 32 controls the velocity of air entering the passage to not exceed a specified level by adjusting the open/close level of the baffles 40, 42. The control unit 32 is preferably electrically connected to the generator 34, but the control unit 32 may be electrically connected to other types of electrical power sources for electrical power (e.g. battery).

G. Alternative Stacked Embodiment.

Figure 8:
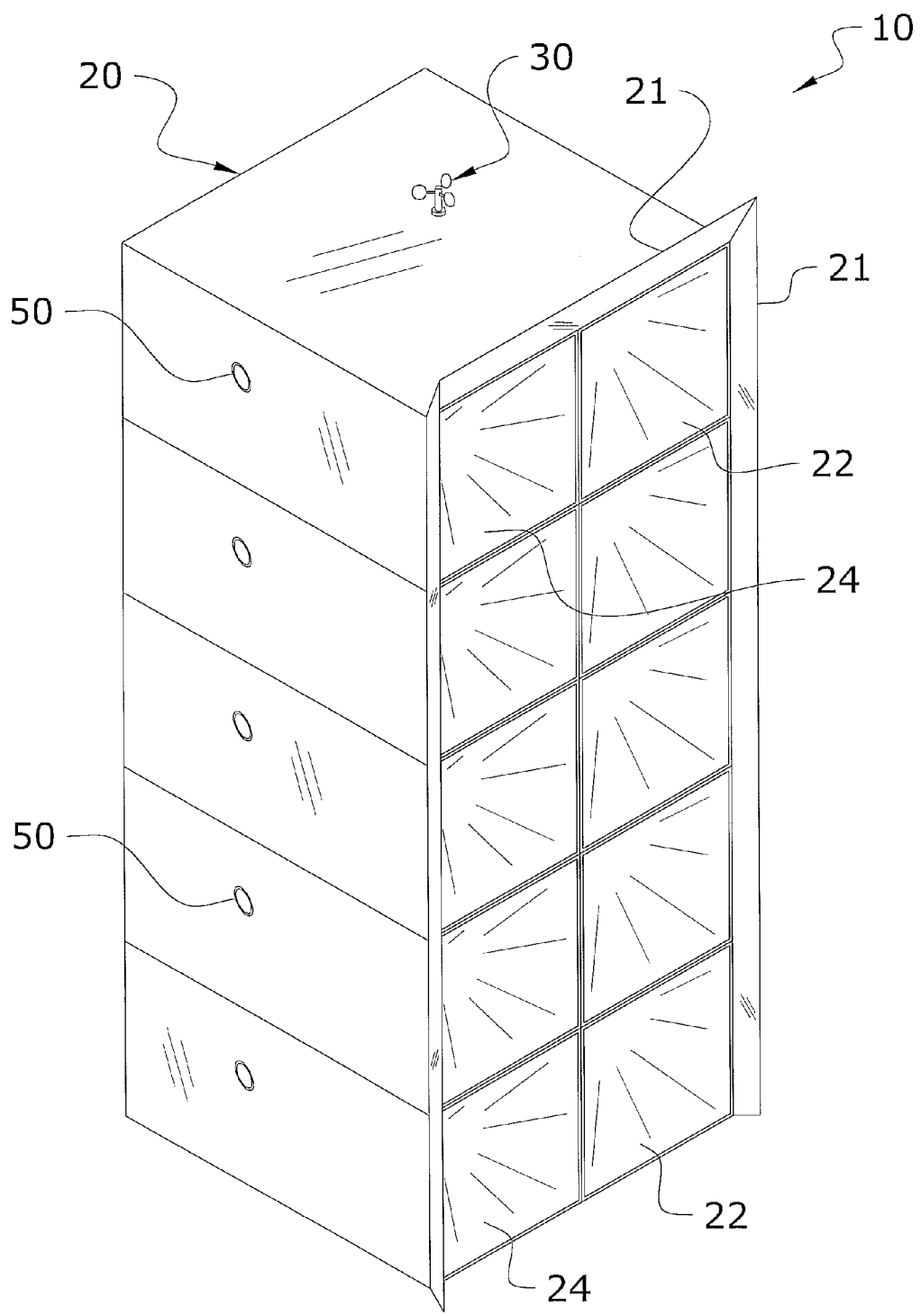
FIG. 8 is an upper perspective view of an alternative embodiment comprised of a stacked arrangement and a tapered funnel for directing the wind into the stacked arrangement.

FIG. 8 illustrates an alternative embodiment of the present invention. In particular, FIG. 8 illustrates the stacking of a plurality of the present invention to provide a combined power source. A single shaft 28 may be utilized that extends through each turbine 26 of each unit and then connected to a single generator 34 for efficiency purposes. It is preferable to include a tapered funnel 21 surrounding the perimeter of the stacked arrangement to assist in directing airflow into the intakes of the units.

H. Operation of Preferred Embodiment.

In use, the anemometer 30 determines the velocity of the wind. If the wind velocity is below a predetermined level, then the baffles 40, 42 remain completely open to allow the maximum amount of airflow into the turbine 26. If the wind velocity exceeds a predetermined level, then the baffles 40, 42 may be partially closed to ensure the turbine 26 does not rotate beyond a maximum rotational velocity. If the wind velocity is extreme such as in a hurricane, the baffles 40, 42 may be completely closed.

The first airflow entering the first intake 22 is directed into the turbine 26 and engages one or more of the paddles of the turbine 26 in a first rotational direction as shown in FIG. 6. The second airflow entering the second intake 24 is directed into the turbine 26 and engages one or more of the paddles 62 of the turbine 26 in the same first rotational direction as the first airflow as shown in FIG. 6. The first airflow passes through the first portion of the passage in the turbine 26 and then exits out through the first exhaust opening 51 just before the entry point of the second airflow. The second airflow passes through the second portion of the passage in the turbine 26 and then exits out through the second exhaust opening 53 just before the entry point of the first airflow. The first portion of the passage and the second portion of the passage each form a C-shaped structure within the shroud and are substantially sealed from one another at all times during operation of the turbine 26 since the first airflow from the first intake 22 exits the turbine through the first exhaust opening 51 before the second airflow from the second intake 24 enters the turbine structure. In this way, the two airflow passages are substantially sealed from one another. Hence the pressurized air in the first portion is applying a rotational force to a first side of the rotor and the pressurized air in the second portion is applying a rotation force to the second side of the rotor.

As the turbine 26 rotates, the rotational energy of the turbine 26 is transferred through the shaft 28 to the generator 34. The generator 34 then converts the mechanical rotational energy to another form of energy (e.g. electricity) which can be utilized immediately or at a later time.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A renewable energy system, comprising:
a turbine comprised of a shroud defining a passage and a rotor rotatably positioned within said shroud;
a generator mechanically connected to said turbine for generating an energy;
a first intake fluidly connected to said turbine at a first location, wherein said first intake receives a first airflow;
a first exhaust opening within said turbine fluidly connected to said passage, wherein said first airflow collected by said first intake passes through a first portion of said passage and exits said first exhaust opening;
a second intake fluidly connected to said turbine at a second location, wherein said second intake receives a second airflow; and
a second exhaust opening within said turbine fluidly connected to said passage, wherein said second airflow collected by said second intake passes through a second portion of said passage and exits said second exhaust opening;
wherein said first portion and said second portion of said passage are separate from one another and do not overlap;
wherein airflow within said first portion and said second portion of said passage is in a first direction thereby rotating said rotor in said first direction.

2. The renewable energy system of claim 1, wherein said energy is comprised of electricity.

3. The renewable energy system of claim 2, wherein said rotor includes a plurality of paddles attached to a perimeter portion of said rotor.

4. The renewable energy system of claim 3, wherein said plurality of paddles are positioned within said passage within said shroud.

5. The renewable energy system of claim 4, wherein said plurality of paddles are comprised of a circular shape that correspond to an interior shape of said passage.

6. The renewable energy system of claim 1, wherein said first intake and said second intake are directed toward a substantially same direction.

7. The renewable energy system of claim 1, wherein said first intake and said second intake are positioned adjacent to one another.

8. The renewable energy system of claim 1, wherein said first intake and said second intake each include a rectangular opening.

9. The renewable energy system of claim 1, wherein said first intake is fluidly connected to said turbine by a first delivery tube and wherein said second intake is fluidly connected to said turbine by a second delivery tube.

10. The renewable energy system of claim 1, wherein said first location and said second location are on substantially opposite sides of said turbine.

11. The renewable energy system of claim 1, including a first outlet connected to said first exhaust opening and extending outwardly from said turbine, and a second outlet connected to said second exhaust opening and extending outwardly from said turbine.

12. The renewable energy system of claim 1, including a first baffle within said first intake to control said first airflow and a second baffle within said second intake to control said second airflow.

13. The renewable energy system of claim 12, including a first actuator connected to said first baffle and a second actuator connected to said second baffle.

14. The renewable energy system of claim 13, including a control unit in communication with and controlling said first actuator and said second actuator.

15. The renewable energy system of claim 14, including an anemometer in communication with said control unit, wherein said anemometer measures a velocity of a wind and wherein said control unit controls the velocity of air entering said passage to not exceed a specified level.

16. The renewable energy system of claim 1, wherein said first intake and said second intake are each tapered.

17. The renewable energy system of claim 1, including a housing surrounding said turbine.

18. The renewable energy system of claim 17, wherein said housing is attached to a roof of a building structure.

19. The renewable energy system of claim 1, wherein said first intake is fluidly connected to said turbine by a first delivery tube and wherein said second intake is fluidly connected to said turbine by a second delivery tube, wherein said second delivery tube includes a redirecting bend that provides a second direction to said second airflow in a direction substantially opposite that of an initial direction of said second airflow.

20. A renewable energy system, comprising:
- a turbine comprised of a shroud defining a passage and a rotor rotatably positioned within said shroud;
- wherein said rotor includes a plurality of paddles attached to a perimeter portion of said rotor;
- wherein said plurality of paddles are positioned within said passage within said shroud;
- wherein said plurality of paddles is comprised of a circular shape that correspond to an interior shape of said passage;
- a generator mechanically connected to said turbine for generating an energy, wherein said energy is electricity;
- a first intake fluidly connected to said turbine at a first location, wherein said first intake receives a first airflow;
- a first exhaust opening within said turbine fluidly connected to said passage, wherein said first airflow collected by said first intake passes through a first portion of said passage and exits said first exhaust opening;
- a second intake fluidly connected to said turbine at a second location, wherein said second intake receives a second airflow;
- a second exhaust opening within said turbine fluidly connected to said passage, wherein said second airflow collected by said second intake passes through a second portion of said passage and exits said second exhaust opening;
- wherein said first portion and said second portion of said passage are separate from one another and do not overlap;
- wherein airflow within said first portion and said second portion of said passage is in a first direction thereby rotating said rotor in said first direction;
- wherein said first intake is fluidly connected to said turbine by a first delivery tube and wherein said second intake is fluidly connected to said turbine by a second delivery tube, wherein said second delivery tube includes a redirecting bend that provides a second direction to said second airflow in a direction substantially opposite that of an initial direction of said second airflow;
- wherein said first intake and said second intake are directed toward a substantially same direction;
- wherein said first intake and said second intake are each tapered;
- wherein said first intake and said second intake are positioned adjacent to one another;
- wherein said first intake and said second intake each include a rectangular opening;
- wherein said first location and said second location are on substantially opposite sides of said turbine;
- a first outlet connected to said first exhaust opening and extending outwardly from said turbine, and a second outlet connected to said second exhaust opening and extending outwardly from said turbine;
- a first baffle within said first intake to control said first airflow and a second baffle within said second intake to control said second airflow;
- a first actuator connected to said first baffle and a second actuator connected to said second baffle;
- a control unit in communication with and controlling said first actuator and said second actuator;
- an anemometer in communication with said control unit, wherein said anemometer measures a velocity of a wind and wherein said control unit controls the velocity of air entering said passage to not exceed a specified level; and
- a housing surrounding said turbine, wherein said housing is attached to a roof of a building structure.

* * * * *